United States Patent [19]

Burtelson

[11] Patent Number: 4,742,661
[45] Date of Patent: May 10, 1988

[54] END FITTING FOR CROSSARM BRACE

[75] Inventor: Frederick W. Burtelson, Harvard, Ill.

[73] Assignee: Joslyn Corporation, Chicago, Ill.

[21] Appl. No.: 928,024

[22] Filed: Nov. 7, 1986

[51] Int. Cl.⁴ .......................... F16B 7/04; E04B 1/58
[52] U.S. Cl. ...................................... 52/697; 52/721; 52/40; 403/331; 403/334; 403/381
[58] Field of Search ................... 52/697, 721, 40; 403/282, 285, 334, 331, 381

[56] References Cited

U.S. PATENT DOCUMENTS

| | | |
|---|---|---|
| 1,815,598 | 7/1931 | Stroup . |
| 1,988,668 | 1/1935 | Snyder .................................. 403/331 |
| 2,056,366 | 10/1936 | Richards et al. ...................... 52/697 |
| 2,283,943 | 5/1942 | Myer . |
| 2,662,620 | 12/1953 | Vojta . |
| 2,906,379 | 9/1959 | Smalley . |
| 3,468,571 | 9/1969 | Farmer ................................. 52/40 X |
| 3,514,140 | 5/1970 | Ely et al. ........................... 403/331 X |
| 3,547,472 | 12/1970 | Ehrman ................................ 403/381 |
| 4,019,298 | 4/1977 | Johnson, IV ................... 403/381 X |

FOREIGN PATENT DOCUMENTS

| | | |
|---|---|---|
| 210479 | 9/1957 | Australia . |
| 1019131 | 10/1952 | France . |
| 584809 | 11/1958 | Italy . |
| 334776 | 1/1959 | Switzerland . |

Primary Examiner—Alfred C. Perham
Attorney, Agent, or Firm—Mason, Kolehmainen, Rathburn & Wyss

[57] ABSTRACT

A metal end fitting for structurally interconnecting a crossarm brace to a crossarm and utility pole includes an extruded metal body having a dovetail recess for receiving an end portion of an enlongated wooden brace. The brace is inserted into the recess of the fitting and a bight portion of the recess abuts an end face of the wooden member. A pair of spaced apart legs integrally joining the bight portion are formed to taper toward one another to directly engage tapered dovetailed surfaces provided on opposite sides of the wooden member. A generally similar metal end fitting is mounted on an opposite end of the wooden brace. Each end fitting includes a tang integrally joining the bight portion and adapted to be secured to the crossarm or the utility pole with a single elongated fastener. The metal fittings are originally extruded so that a degree of taper is provided between the opposite legs which form the dovetailed recess, and this taper angle is greater than the degree of taper between the dovetailed surfaces of the wooden brace at the ends. Accordingly, the legs of the metal end fitting are forcefully biased by internal spring action to tightly confront the dovetailed surfaces of the wooden brace to permanently secure the metal end fitting in place on the wooded brace without requiring fasteners.

27 Claims, 2 Drawing Sheets

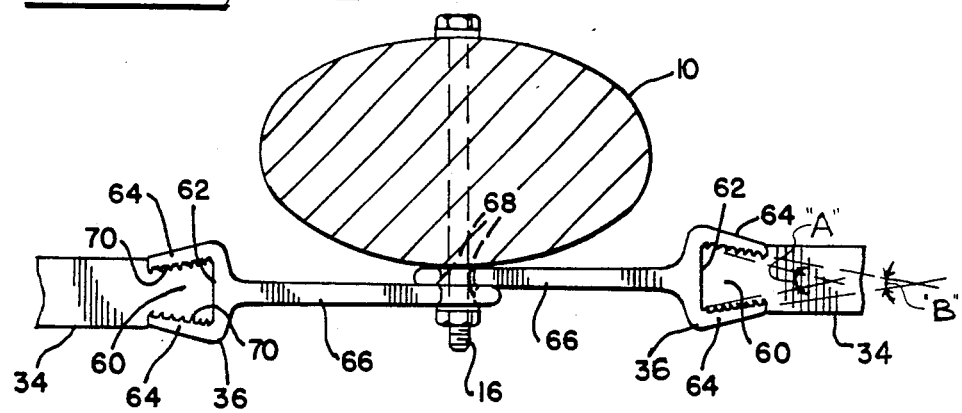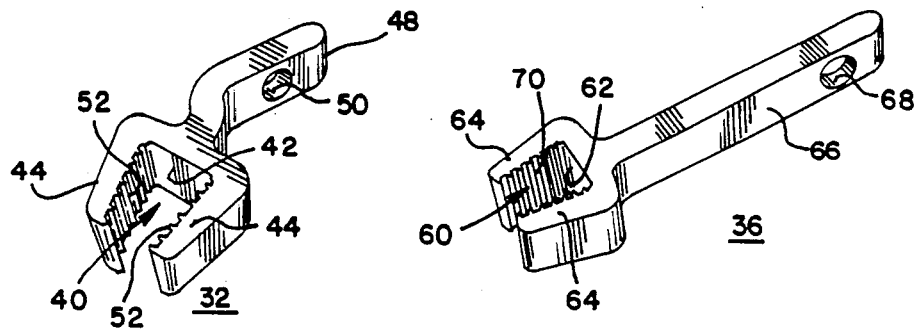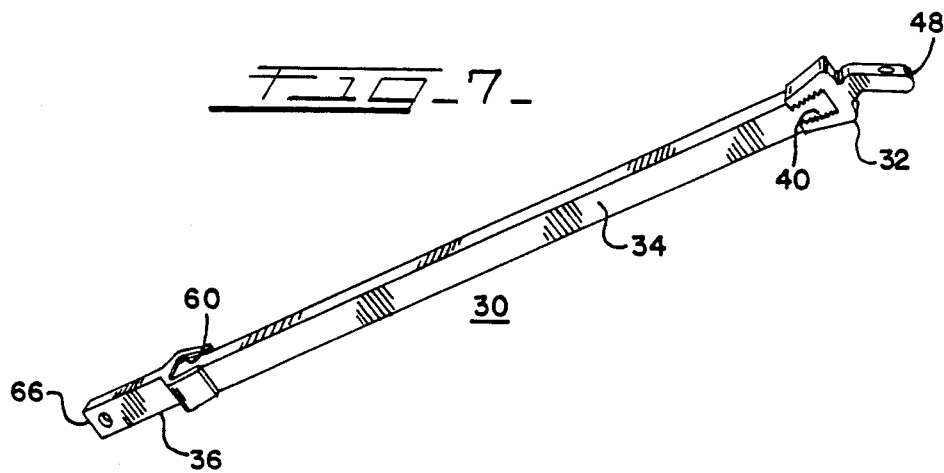

END FITTING FOR CROSSARM BRACE

BACKGROUND OF THE INVENTION

1. Field of the Invention

The present invention relates to an improved metal end fitting for a crossarm brace and more particularly to an extruded metal end fitting wherein spring action of opposite legs forming a dovetail recess is effective to secure and clamp the end fitting permanently in place on an elongated wooden brace extending between a crossarm and a utility pole.

2. Description of the Prior Art

Electric utility poles having crossarms at the upper end are commonly supported by elongated diagonal braces extending upwardly and outwardly from the pole to opposite sides of the crossarm. These braces are usually made of high grade wood and a wide variety of metal end fittings have been provided for interconnecting opposite ends of the brace to the pole and crossarm respectively. Crossarm braces and connectors are disclosed in U.S. Pat. Nos. 3,468,571, 2,906,379, 2,662,620, 2,283,943, 1,815,598, Italian Pat. No. 584,809, Swiss Pat. No. 334,776, French Pat. No. 1,019,131 and Australian Pat. No. 210,479.

OBJECTS OF THE PRESENT INVENTION

It is an object of the present invention to provide a new and improved metal end fitting for structurally interconnecting an end portion of an elongated wooden brace to a utility pole of crossarm structural member.

It is another object of the present invention to provide a new and improved metal end fitting for attachment to an end of an elongated wooden brace.

Another object of the present invention is to provide a new and improved crossarm support structure for a utility pole and the like and a structure which utilizes wooden crossarm braces having extruded metal end fittings of improved design.

More specifically, it is an object of the present invention to provide a new and improved metal end fitting having a dovetail recess for receiving the end portion of an elongated wooden brace wherein the recess is defined by a bight portion adapted to abut the end face of the wooden brace and a pair of integral, spaced apart legs tapered toward one another and engaging dovetail shape recesses provided on the wooden brace adjacent the end.

It is another object of the present invention to provide a new and improved extruded metal end fitting of the character described which utilizes internal spring action of the tapered legs for tightly engaging the wood so as to accommodate variances in the tapered recesses of the wooden brace and to accommodate any changes resulting from wood shrinkage and/or swelling.

Another object of the invention is to provide a new and improved extruded metal end fitting of the character described wherein the same design concept can be used on wooden braces of several different cross sections.

Another object of the present invention is to provide a new and improved extruded metal end fitting of the character described which does not result in damage to the heart of the wooden brace cross section.

Still another object of the present invention is to provide a new and improved brace wherein an extruded metal end fitting is pressed on to the end of a wooden member in a manner whereby no bolts, nuts, pins, or other fasteners are required for permanently securing the end fitting in place.

Another object of the invention is to provide a new and improved crossarm brace employing a metal end fitting which is pressed on and adhesively secured to an elongated wooden brace member.

Still another object of the present invention is to provide a new and improved crossarm support structure wherein a minimum number of components are required, thus minimizing inventory and assembly problems.

Yet another object of the present invention is to provide a new and improved crossarm brace structure which optimizes the useful life of the structure by maintaining the integrity of the heart of the wooden brace member.

BRIEF SUMMARY OF THE INVENTION

The foregoing and other objects and advantages of the present invention are accomplished in a new and improved embodiment which includes an extruded metal end fitting mounted on the end of an elongated wooden brace for connecting the brace to another member such as a utility pole or crossarm. The metal end fitting includes a metal body extruded to have a dove-tail recess for receiving the end portion of the brace and the recess is defined by a bight portion adapted to abut an end face of the brace and a pair of spaced apart legs integrally joining the bight and tapered toward one another adapted to engage matching tapered dovetailed recesses formed adjacent the end of the wooden brace. The degree of taper angle between opposite legs of the metal end fitting is greater than the degree of taper angle initially provided between the opposite dovetail recess surfaces of the wooden brace so that the legs are internally biased like springs against the wood to secure the brace in place without requiring nuts, bolts, drilling pins, etc. as heretofore often required in prior art systems.

DESCRIPTION OF THE DRAWING

For a better understanding of the present invention reference should be had to the following detailed description taken in conjunction with the drawing, in which:

FIG. 4 is a fragmentary transverse cross-sectional view of the utility pole taken substantially along lines 4—4 of FIG. 2;

FIG. 5 is a perspective view of a new and improved extruded metal end fitting constructed in accordance with the features of the present invention and especially adapted for use at the upper end of a diagonal wooden brace;

FIG. 6 is a perspective view of an extruded metal end fitting in accordance with the features of the present invention especially adapted for use at the lower end of a diagonal wooden brace; and FIG. 7 is a perspective view of an elongated brace having metal end fittings constructed in accordance with the features of the present invention.

DESCRIPTION OF A PREFERRED EMBODIMENT

Figure 1:
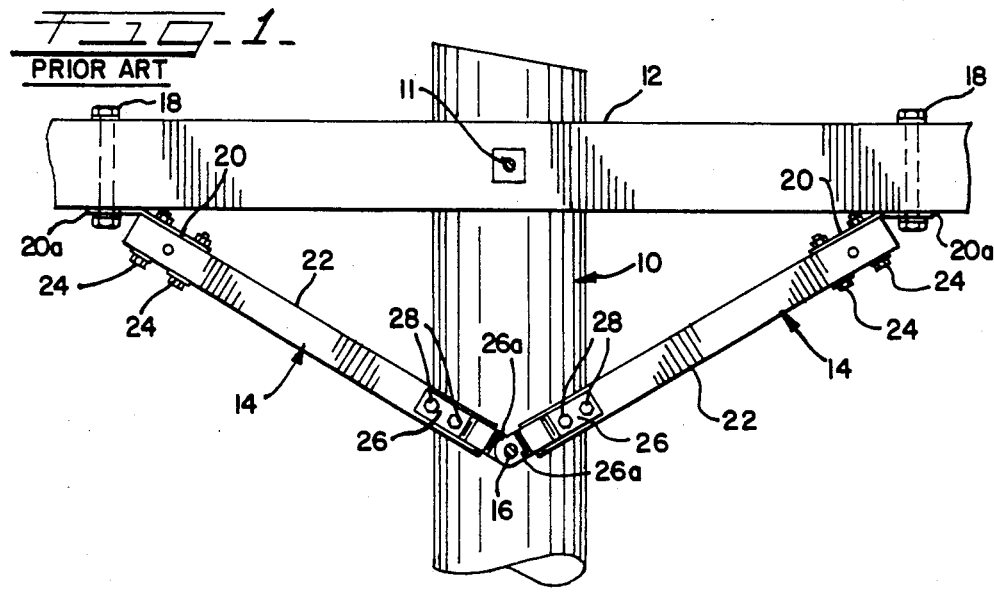
FIG. 1 is a fragmentary elevational view of a typical prior art utility pole having a crossarm and conventional diagonal braces.

Turning now more particularly to the drawings, in FIG. 1 is illustrated a typical prior art type pole line crossarm and brace supporting structure wherein a wooden utility pole 10 supports a wooden crossarm 12 bolted thereto and a pair of diagonal crossarm braces 14 are interconnected between a common bolt 16 extended through the utility pole at the lower end of the braces 14 and interconnected at the upper end and secured to the crossarm by bolt and nut assemblies 18. In typical prior art fashion, each crossarm brace 14 includes an upper end fitting 20 formed of metal and having a tang 20a extending outwardly from the end of an elongated wooden brace 22. The tang 20a is secured to the crossarm by the bolt and nut assembly 18, and the upper end fitting 20 in turn is secured to the wooden brace member 22 by a pair of nut and bolt assemblies 24 which require drilling directly through the central or heart portion of the wooden brace member adjacent the upper end portion. At the lower end, each crossarm brace 14 is provided with a metal end fitting 26 having a tang 26a to accommodate the bolt and nut assembly 16 extending through the utility pole 10. In turn, the tangs 26a are bolted to the lower end portion of the wooden member 22 by pairs of nut and bolt assemblies 28, each requiring the drilling of a hole through the central or heart of the wooden member adjacent the lower end portion. One of the problems often associated with prior art crossarm braces of the type shown is caused by repeated swelling and contraction of the wood and the consequential loosening of bolts used for securing the metal end fittings to the wooden braces.

Referring now more particularly to FIGS. 2-8, therein is illustrated a new and improved, elongated, diagonal crossarm brace 30 (FIG. 7) adapted to support and brace a horizontal crossarm 12 mounted on a utility pole 10 and secured thereto at the center by a bolt and nut assembly 11. Upper ends of the novel crossarm braces 30 are secured to the crossarm 12 by nut and bolt assemblies 18 and lower ends of the diagonal crossarm braces are secured to the pole 10 by a single, common nut and bolt assembly 16 as shown best in FIG. 4.

In accordance with the present invention, each diagonal brace 20 includes an upper metal end fitting 32 permanently secured in place on an upper end portion of an elongated wooden brace 34 formed of high quality wood having straight clear grain and well adapted to withstand adverse weather conditions for many years. Preferably, the wooden members 34 are formed with a square transverse cross-section although rectangular cross-sectional members can be used in special applications when necessary. Dependent upon the stress requirements for a particular application, the transverse cross-sectional dimensions are increased in response to greater lengths required and shorter length members will naturally have a smaller transverse cross-sectional dimensions than longer members.

Each crossarm brace 30 is provided with a new and improved metal end fitting 36 secured to the lower end portion of the wooden brace 34 and to the utility pole 10 by the common nut and bolt assembly 16. It will thus be seen that the new and improved crossarm brace 30 employs only three component parts, namely an elongated wooden brace member 34, an upper metal end fitting 32 and a lower metal end fitting 36. No bolts, washers, nuts or other fasteners are needed and no drilling of the wooden member 34 through the central or heart portion thereof is required.

The upper metal end fitting 32 is preferably formed of aluminum or an alumina alloy for better resistance to deterioration by weather and is formed in an extrusion process. Each individual end fitting is cut from an elongated extruded stock member at dimensional intervals equal to the transverse cross-section of the wooden brace members 34. Each end fitting is formed with a dovetail shaped recess 40 having a bight portion 42 adapted to abut the end of the elongated wooden brace member 34. The metal end fitting includes a pair of legs 44 having opposite inner side walls extending outwardly of the bight portion 42 and tapering inwardly toward one another at an acute angle of taper represented by the phantom lines 46 when the end fitting is in an unstressed condition and before assembly onto the end of an elongated wooden brace member 34. A tang 48 is integrally joined to the center of the bight portion 42 and the tang is offset angularly with respect to the inside surface of the bight portion in order to properly mate against the underside of the crossarm 12 when the finished diagonal brace 30 is secured in place. An opening 50 is formed in the tang portion to accommodate the shank of the bolt 18 utilized for attaching the upper end fitting 32 to the undersurface of the crossarm. For better gripping engagement between the inside surfaces of the metal legs 44 of the end fitting 32 and the upper end portion of the wooden brace 34, the metal legs are provided with serrations or teeth 52 having sharpened outer edges and adapted to bite into the adjacent surface of the wooden brace member.

Figure 3:
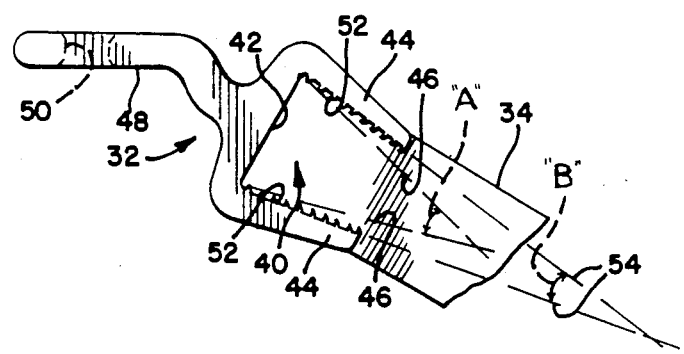
FIG. 3 is an enlarged elevational view of an upper end portion of a diagonal brace employing an end fitting in accordance with the present invention.

As best shown in FIG. 3, opposite sides of the upper end portion of the wooden brace 34 are formed with shallow, dovetail-shaped, tapered recesses having an angle of taper represented by the phantom lines 54 which intersect at an angle "B" which is shallower or less than the angle of intersection "A". After the shallow dovetail grooves have been formed in the upper end portion of the elongated wooden member 34, the metal end fitting 32 is readied for attachment and the outer end of the legs 44 are spread apart so that the dovetail end portion of the wooden brace can be inserted into the recess 40 of the metal end fitting. The opening force applied to the legs 44 is then released and the legs spring back toward the original angle of taper "A" and thus are continuously internally biased, in spring-like engagement against the surfaces of the dovetailed recesses provided in the wooden brace. The teeth or ridges 52 of the legs 44 tightly grip into the wood surfaces of the brace for better holding action and if desired an adhesive material may be provided to provide an even better bond between the engaged surfaces of the metal and wood.

Because of the designed angular interference between metal and wood (angles A & B) as represented by the lines 46 and 54, a permanent long-lasting attachment of the metal end fitting 32 onto the end of the elongated wooden brace 34 is attained without requiring the drilling of holes in the heart or central portion of the wooden brace, which drilling tends to weaken the brace. Moreover, by providing for a natural, interally biased attachment of the metal end fitting, the fittings remain tightly in place on the wooden element even through the wood may expand and contract in response to various weather conditions to a great degree. The metal end fitting 32 presents a neat appearance and eliminates the need for two sets of nut and bolt assemblies such as the assemblies 24 as are required in the prior art system illustrated in FIG. 1. The end fitting 32 permits manufacturing operations to be greatly simplified and parts inventories and stocking space are reduced because of the fewer parts required.

Referring now specifically to FIGSS. 2, 4, 6 and 7, the lower end fittings 36 are also formed of extruded metal cut from an elongated extrusion to appropriate widths to match that of the wooden brace 34. Each lower end fitting includes a dovetail shaped recess 60 formed with a bight portion 62 adapted to abut the lower end of the elongated wooden brace member 34. A pair of legs 64 are integrally joined to the bight portion 62 and have an initially formed angle of taper "A" that is greater than the angle of taper "B" between the facing surfaces of a pair of dovetailed recesses provided in the lower end portion of the wooden brace 34. Each lower end fitting includes a straight, elongated tang 66 extending outwardly from the outside surface of the bight portion 62 at right angles and adjacent an outer end of the tang, an opening 68 is provided for accommodating the bolt of the common nut and bolt assembly 16 extending through the utility pole 10 for securing the lower ends of the diagonal cross members 30 in place to support the horizontal crossarm 12. Inside faces of the legs 64 forming the side walls of the dovetail-shaped recess 60 are provided with elongated teeth 70 for biting engagement with the opposing surfaces on opposite sides of the lower end portion of the elongated wooden brace 34.

Like the upper end fitting 32, the lower end fitting 36 is initially extruded with an angle of inward taper "A" measured between the legs 64 that is greater than the angle of taper "B" measured between the opposite dovetail recesses at the lower end portion in the wooden brace 34. The lower end portion of the wooden brace is inserted into the dovetail recess 60 while the legs are sprung open and subsequently when the legs are released, they spring back into tight engagement against the wood surfaces of the recesses. The teeth or ridges 70 bit into the wood to provide excellent permanent holding action even through the wooden brace itself 34 expands and contracts with changes in weather conditions.

Figure 2:
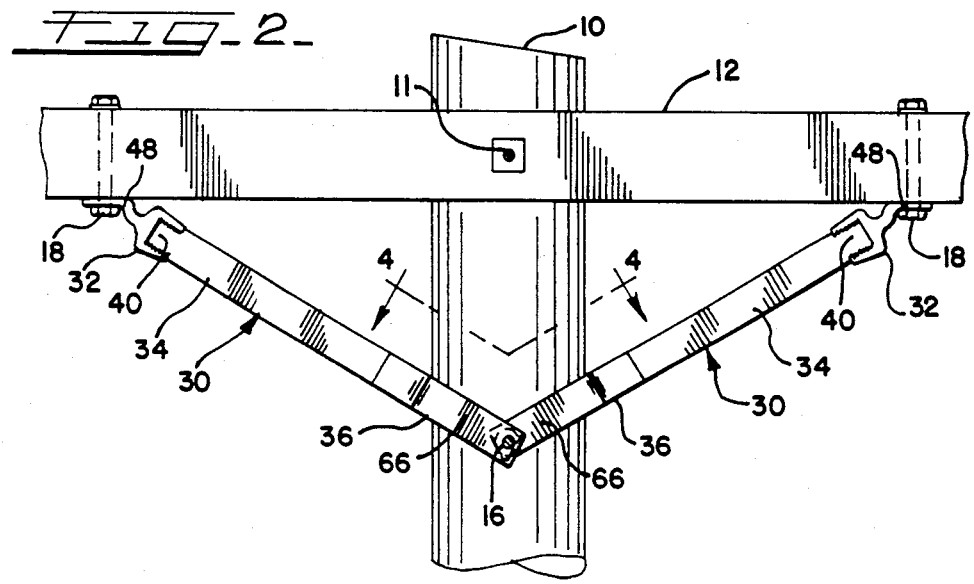
FIG. 2 is a fragmentary elevational view of a new and improved utility pole structure employing a crossarm and a pair of diagonal wooden braces having metal end fittings constructed in accordance with the features of the present invention.

The legs 64 of the lower end fitting 36 and the legs 44 of the upper end fitting 32 have a wall section of variable thickness which tapers from a maximum value adjacent the bight portion to a minimum thickness adjacent the outer end. The thickened portion of the legs provides ample internal strength to continuously compress the inner faces tightly against the surfaces of the dovetail shaped recesses provided in the wooden brace 34, so as to require no drilling or fasteners extended through the central, heart portion of the wooden member. Additional external compression forces may be provided to press the opposing legs toward one another when the end fittings are installed on the wooden brace. Thus, the strength characteristics and visual appearance of the assembled braces 30 as shown in FIG. 7 are far superior to the prior art brace 14 as shown in FIG. 1. It is also to be noted that the entire pole line crossarm and brace structure shown in FIG. 2 is assembled together with only four (4) nut and bolt assemblies 11, 16 and 18 whereas the prior art system of FIG. 1 requires an additional eight (8) nut and bolt assemblies for use in installing the system. Not only is the improved crossarm brace system neater in appearance as illustrated in FIGS. 2 through 7 but the system is stronger and will last longer.

Obviously, many modifications and variations of the present invention are possible in light of the above teachings. Thus, it is understood that, within the scope of the appended claims, the invention may be practiced otherwise than as specifically described above.

What is claimed is:

1. A metal end fitting for structurally interconnecting an end portion of an elongated wooden structural member to a second member, said fitting comprising:

a body having a dovetail recess for receiving said end portion of said wooden structural member, said recess defined by a bight portion adapted to abut an end face of said wooden structural member and a pair of spaced apart legs integrally joining said bight portion and tapered toward one another extending outwardly of said bight portion, said legs adapted to engage opposite sides of said wooden structural member against tapered dovetail surfaces formed adjacent said end face, and wherein a degree of taper is provided between said legs extending toward one another that is greater than a degree of taper initially provided between said dovetail surfaces of said structural member adapted to confront said legs, whereby said legs are forcefully biased against confronting dovetail surfaces of said structural member upon assembly of said end fitting onto the end portion of said structural member.

2. The metal end fitting of claim 1 wherein each leg is dimensioned to have a thickness adjacent said bight portion that is greater than the thickness adjacent an outer end of the leg in order to compensate for increased bending stress when said legs are sprung open for fitting onto said end portion of said wooden structural member.

3. The metal end fitting of claim 1 wherein each of said legs is formed with teeth on an inside face confronting said dovetail surface of said wooden structural member for better gripping action.

4. The metal end fitting of claim 3 wherein said teeth comprise spaced apart ridges aligned parallel to one another and parallel of an inside surface of said bight portion confronting said end face of said wooden structural member.

5. The metal end fitting of claim 1 including a tang integrally joining said bight portion and extending outwardly thereof in a direction away from said legs for attachment to said second member.

6. The metal end fitting of claim 5 wherein said tang is formed with an aperture for receiving a fastener for securing a side of said tang against said second member.

7. The metal end fitting of claim 6 wherein said side of said tang is aligned generally normal of said bight portion.

8. The metal end fitting of claim 6 wherein said side of said tang is aligned at an acute angle relative to said bight portion.

9. An elongated composite structural component including a metal end fitting mounted on an end portion of an elongated wooden structural member for connection to a second member;

said end fitting including a body having a dovetail recess for receiving said end portion of said wooden structural member, said recess defined by a bight portion adapted to abut an end face of said wooden structural member and a pair of spaced apart legs integrally joining said bight portion and tapered toward one another extending outwardly of said bight portion, said wooden structural member having a pair of tapered dovetail surfaces formed on opposite sides adjacent said end face for receiving said legs of said end fitting, said legs having a degree of taper therebetween extending toward one another that is greater than a degree of taper initially provided between said dovetail surfaces of said wooden structural member adapted to confront said legs, whereby said legs are forcefully biased against confronting dovetail surfaces of said wooden structural member upon assembly of said end fitting onto the end portion of said wooden structural member.

10. The composite structural component of claim 9 wherein each leg of said metal end fitting is dimensioned to have a thickness adjacent said bight portion that is greater than the thickness adjacent an outer end of the leg in order to compensate for increased bending stress when said legs are sprung open for fitting onto said end portion of said structural member to form said composite wooden structural component.

11. The composite structural component of claim 10 wherein each leg of said metal end fitting is formed with teeth on an inside face confronting said dovetail surfaces of said wooden structural member for better gripping action between said metal end fitting and said wooden member.

12. The composite structural component of claim 11 including adhesive means between inside toothed surfaces of said legs of said metal end fitting and adjacent confronting dovetail surfaces of said wooden structural member.

13. The composite structural component of claim 11 wherein said teeth on said legs of said metal end fitting comprise spaced apart ridges aligned parallel to one another and parallel of an inside surface of said bight portion confronting said end face of said wooden structural member.

14. The composite structural component of claim 9 including a tang on said metal end fitting integrally joining said bight portion and extending outwardly thereof in a direction away from said legs for attachment to said second member.

15. The composite structural component of claim 14 wherein said tang of said metal end fitting is formed with an aperture for receiving a fastener for securing a side of said tang against said second member.

16. The composite structural component of claim 15 wherein said side of said tang of said metal end fitting is aligned generally normal of said bight portion.

17. The composite structural component of claim 15 wherein said side of said tang of said metal and fitting is aligned at an acute angle relative to said bight portion.

18. The composite structural component of claim 9 including adhesive means between inside surfaces of said legs of said metal end fitting and adjacent confronting dovetail surfaces of said wooden structural member.

19. A method of making a composite elongated structural component for use in structurally interconnecting a pair of members of a support structure, said method comprising the steps of:

forming a pair of dovetail shaped surfaces on opposite sides of an elongated wooden structural member adjacent an end portion, said opposite dovetail surfaces tapering toward one another inwardly of an end face of said wooden structural member at a selected angle of taper;

forming a metal end fitting for attachment onto said end portion of said wooden structural member, said end fitting formed to have a dovetail recess including a bight portion adapted to confront said end face of said wooden structural member and a pair of legs integrally joining said bight portion and tapered toward one another outwardly of said bight portion at a reduced angle of taper greater than said selected angle of taper;

springing open said legs of said metal end fitting to a more fully open position adjacent their outer ends in order to receive said end portion of said wooden structural member in said recess;

positioning said end portion of said wooden structural member in said dovetail recess of said metal end fitting; and releasing said lges of said metal end fitting to spring back toward one another to engage and hold against adjacent confronting dovetail surfaces on said end portion of said wooden structural member.

20. The method of claim 19 including the step of:

interposing an adhesive between adjacent confronting surfaces of said lens of said metal end fitting and said dovetail surfaces of said wooden structural member before pressing said legs of said metal end fitting to spring back toward one another.

21. The method of claim 19 including the steps of providing teeth on inside faces of said legs of said metal end fitting and penetrating said teeth into said end portion of said wooden structural member when said legs are permitted to spring back toward one another to engage and hold against said adjacent confronting dovetail surfaces of said structural member.

22. The method of claim 19 including the step of pressing said outer ends of said legs toward one another to engage and hold against said adjacent confronting dovetail surfaces of said wooden structural member.

23. A structure for supporting pole line hardware on a utility pole, comprising:

a cross-arm secured on said pole and having an outer end portion projecting outwardly thereof;

an elongated, diagonal brace interconnected between said outer end portion of said cross-arm and said pole at a level spaced from said cross-arm;

said diagonal brace comprising an elongated wooden structural member having a pair of tapered, dovetailed surfaces on opposite sides adjacent each opposite end thereof and a metal end fitting mounted adjacent each opposite end of said wooden structural member engaging said pair of dovetailed surfaces;

each of said end fittings including a body having a dovetail recess for receiving one of said opposite ends of said wooden structural member, said recess defined by a bight portion abutting an end face of said wooden structural member and a pair of spaced apart legs integrally joining said bight portion and tapered toward one another extending away from said bight portion in confronting engagement with said pair of dovetailed surfaces of said wooden structural member;

said legs of each end fitting having an angular degree of taper therebetween that is greater than the angular degree of taper of said dovetail surface of said wooden structural member engaged therewith whereby said legs are forcefully biased against said dovetail surfaces of said wooden structural member; and each of said metal end fittings including an integral tang extending outwardly of said bight portion opposite said legs, said tangs having an opening therein for receiving a fastener for securing opposite ends of said brace to extend diagonally between said pole and said cross-arm.

24. The structure of claim 23 wherein said elongated wooden structural member of said brace has a polygonal transverse cross section with at least two pairs of parallel opposite sides generally normal to one another, one pair of said parallel opposite sides aligned to position a tang of one end fitting in tangential arrangement relative to said pole and the other pair of said parallel opposite sides normal thereto in angular alignment relative to a surface of said cross-arm generally normal to said pole.

25. The structure of claim 24 wherein said tang of said other metal end fitting includes an outer end portion that is angularly disposed relative to said other pair of parallel opposite sides of said wooden structural member to lie in parallel abutting relation to said surface of said cross-arm normal to said pole.

26. The structure of claim 23 wherein said cross-arm includes a second outer end portion extending outwardly of said pole in a direction opposite said first mentioned outer end portion; and another of said diagonal braces interconnected between said second outer end portion of said cross-arm and said pole at said level spaced from said cross-arm.

27. The structure of claim 26 wherein said tangs of said metal end fittings on said respective braces adjacent said pole are in overlapping relation with said openings thereof aligned to receive a common fastener extending from said pole at said level spaced from said cross-arm.

* * * * *

UNITED STATES PATENT AND TRADEMARK OFFICE
CERTIFICATE OF CORRECTION

PATENT NO. : 4,742,661

DATED : 10 May 1988

INVENTOR(S) : F.W. BURTELSON

It is certified that error appears in the above-identified patent and that said Letters Patent is hereby corrected as shown below:

```
Column 6, line 46, "to" should be --of--;
Column 7, line 42, "to" should be --of--;
Column 7, line 59, "and" should be --end--;
Column 8, line 8 , after the comma (,) insert a space;
Column 8, line 23, "lges" should be --legs--;
```

Signed and Sealed this

Twentieth Day of December, 1988

Attest:

DONALD J. QUIGG

*Attesting Officer*     *Commissioner of Patents and Trademarks*